United States Patent
Costa

(10) Patent No.: US 9,361,084 B1
(45) Date of Patent: Jun. 7, 2016

(54) METHODS AND SYSTEMS FOR INSTALLING AND EXECUTING APPLICATIONS

(71) Applicant: Google Inc., Mountain View, CA (US)

(72) Inventor: Antonio Bernardo Monteiro Costa, Mountain View, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 14/080,059

(22) Filed: Nov. 14, 2013

(51) Int. Cl.
*G06F 17/27* (2006.01)
*G06F 9/445* (2006.01)
*G10L 19/00* (2013.01)

(52) U.S. Cl.
CPC .. *G06F 8/61* (2013.01); *G10L 19/00* (2013.01)

(58) Field of Classification Search
CPC ............ G10L 15/222; G10L 2015/223; G10L 2015/225; G10L 2015/228
USPC ....................................... 704/270, 270.1, 275
See application file for complete search history.

(56) References Cited

U.S. PATENT DOCUMENTS

| | | | |
|---|---|---|---|
| 5,668,928 A | 9/1997 | Groner | |
| 7,043,450 B2 | 5/2006 | Velez et al. | |
| 7,548,915 B2 | 6/2009 | Ramer et al. | |
| 7,606,700 B2 | 10/2009 | Ramsey et al. | |
| 2003/0115057 A1 | 6/2003 | Junqua et al. | |
| 2003/0171928 A1 | 9/2003 | Falcon et al. | |
| 2004/0054520 A1 | 3/2004 | Dehlinger et al. | |
| 2004/0225499 A1 | 11/2004 | Wang et al. | |
| 2004/0230676 A1 | 11/2004 | Spivack et al. | |
| 2005/0193014 A1 | 9/2005 | Prince | |
| 2007/0038449 A1 | 2/2007 | Coifman | |
| 2007/0061335 A1 | 3/2007 | Ramer et al. | |
| 2007/0088556 A1* | 4/2007 | Andrew | G10L 15/19 704/270.1 |
| 2007/0130134 A1 | 6/2007 | Ramsey et al. | |
| 2007/0156406 A1 | 7/2007 | Barton et al. | |
| 2007/0179971 A1 | 8/2007 | Benson | |
| 2008/0153465 A1* | 6/2008 | Evermann | G06F 17/30899 455/414.1 |
| 2008/0195997 A1 | 8/2008 | Herberger et al. | |
| 2008/0208589 A1 | 8/2008 | Cross | |
| 2009/0030697 A1 | 1/2009 | Cerra et al. | |
| 2009/0144131 A1 | 6/2009 | Chiu et al. | |

(Continued)

OTHER PUBLICATIONS

Schalkwyk, Johan, Third Party Voice-Actions via FormLets, Draft Ver. 1.0, printed Nov. 28, 2011, 12 pages.

(Continued)

*Primary Examiner* — Richemond Dorvil
*Assistant Examiner* — Rodrigo Chavez
(74) *Attorney, Agent, or Firm* — Middleton Reutlinger

(57) ABSTRACT

Methods and systems for receiving applications are described. A device, such as a wearable computing device, may receive an input, which may be verbal, motion, or text, for example. The device may parse the input to recognize any keywords and may further identify applications associated with the recognized keywords. The device may determine a priority list for the identified applications based at least in part on a relevance associated with the recognized keywords. In addition, the device may provide for display the priority list of the applications. The device may receive a request to access an application from the plurality of applications, and in response to the request to access the application, install the application. The device may further execute the installed application to perform a function based at least in part on the verbal input, which may be executed without additional input after installation.

18 Claims, 7 Drawing Sheets

(56) References Cited

U.S. PATENT DOCUMENTS

| | | | |
|---|---|---|---|
| 2009/0192972 | A1 | 7/2009 | Spivack et al. |
| 2009/0326947 | A1 | 12/2009 | Arnold et al. |
| 2009/0327979 | A1 | 12/2009 | Haverinen et al. |
| 2010/0005079 | A1 | 1/2010 | Bayliss |
| 2010/0082511 | A1 | 4/2010 | Niu et al. |
| 2010/0082652 | A1 | 4/2010 | Jones et al. |
| 2010/0094752 | A1 | 4/2010 | Heath |
| 2010/0151788 | A1 | 6/2010 | Rahman et al. |
| 2011/0047452 | A1 | 2/2011 | Ativanichayaphong et al. |
| 2011/0066634 | A1 | 3/2011 | Phillips |
| 2011/0106527 | A1 | 5/2011 | Chiu |
| 2011/0184730 | A1 | 7/2011 | LeBeau et al. |
| 2011/0295852 | A1 | 12/2011 | Wang et al. |
| 2011/0314004 | A1 | 12/2011 | Mehta |
| 2012/0016678 | A1 | 1/2012 | Gruber et al. |
| 2012/0124061 | A1 | 5/2012 | Macbeth et al. |
| 2012/0197743 | A1 | 8/2012 | Grigg et al. |
| 2012/0259891 | A1 | 10/2012 | Edoja |
| 2012/0313849 | A1 | 12/2012 | Bak |
| 2013/0054418 | A1* | 2/2013 | Yang ............ H04W 4/001 705/26.61 |
| 2013/0080177 | A1 | 3/2013 | Chen |
| 2013/0297317 | A1* | 11/2013 | Lee ............ H04M 1/72552 704/270.1 |
| 2014/0172862 | A1* | 6/2014 | Wu ............ G06F 17/30598 707/740 |

OTHER PUBLICATIONS

Learn More About Siri, Apple, Frequently Asked Questions, http://www.apple.com/iphone/features/siri-faq.html, printed Nov. 28, 2011, 4 pages.

Content Providers, Mobile Content Provider—Mobile Partnerships, Vlingo, http://www.vlingo.com/partners/content-providers, printed Nov. 28, 2011, 1 page.

Anthony, Sebastian, What is Apple's Siri, and will anyone use her?, http://www.extremetech.com/computing/98491, Oct. 4, 2011, 2 pages.

Technology, Vlingo, http://www.vlingo.com/about/technology, printed Nov. 28, 2011, 2 pages.

Final Office Action issued Feb. 28, 2014 in connection with U.S. Appl. No. 13/648,042, filed Oct. 9, 2012, 17 pages.

Here's How to Open Third Party Apps Using Siri, iGadgets Report, Nov. 7, 2011, 3 pages.

Sasaki et al., A Collaborative Lexical Data Design System for Speech Recognition Application Developers, CSCW, Feb. 6, 2010, pp. 455-456.

* cited by examiner

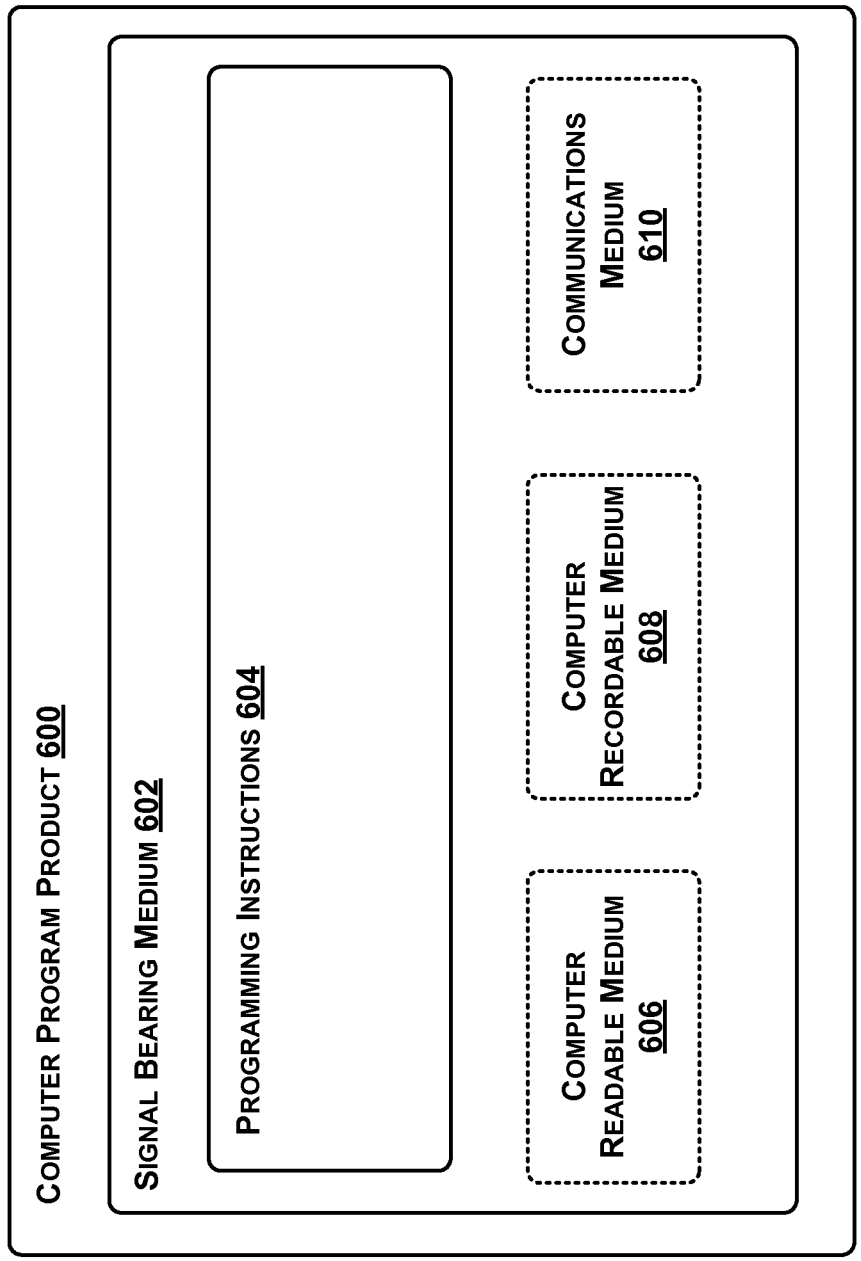

METHODS AND SYSTEMS FOR INSTALLING AND EXECUTING APPLICATIONS

BACKGROUND

Unless otherwise indicated herein, the materials described in this section are not prior art to the claims in this application and are not admitted to be prior art by inclusion in this section.

As technology progresses, an increasing amount of devices utilize mobile applications configured to perform a variety of functions. A mobile application may be a software application that is designed to run on and execute programmed tasks for a variety of devices, such as smartphones, tablet computers, and other mobile devices. Mobile applications are typically available through application distribution platforms and may be downloaded by a device wirelessly from a server that holds the applications. In some instances, mobile applications may be downloaded by a device for free or may be downloaded for a purchase price.

SUMMARY

The present application discloses example systems and methods for receiving applications. In one aspect, the present application describes a method. The method may include receiving a verbal input and parsing the verbal input to recognize one or more keywords. The method may also include identifying a plurality of applications associated with the recognized one or more keywords and determining a priority list for the plurality of applications based at least in part on a relevance associated with the one or more recognized keywords. The method may further include providing for display the priority list for the plurality of applications and receiving a request to access an application from the priority list for the plurality of applications. The method may also include, in response to the request to access the application, installing the application; and executing the installed application to perform a function based at least in part on the verbal input.

In another aspect, the present application describes a non-transitory computer readable medium having stored thereon executable instructions that, upon execution by a computing device, cause the computing device to perform functions. The functions may comprise receiving a verbal input and parsing the verbal input to recognize one or more keywords. The functions may also include identifying a plurality of applications associated with the recognized one or more keywords and determining a priority list for the plurality of applications based at least in part on a relevance associated with the one or more recognized keywords. The functions may further include providing for display the priority list for the plurality of applications and receiving a request to access an application from the priority list for the plurality of applications. The functions may also include, in response to the request to access the application, installing the application; and executing the installed application to perform a function based at least in part on the verbal input.

In a further aspect, the present application describes a system. The system may comprise at least one process. The system also may comprise a memory having stored thereon executable instructions that, upon execution by the at least one processor, cause the system to perform functions comprising receiving a verbal input and parsing the verbal input to recognize one or more keywords. The functions may also include identifying a plurality of applications associated with the recognized one or more keywords and determining a priority list for the plurality of applications based at least in part on a relevance associated with the one or more recognized keywords. The functions may further include providing for display the priority list for the plurality of applications and receiving a request to access an application from the priority list for the plurality of applications. The functions may also include, in response to the request to access the application, installing the application; and executing the installed application to perform a function based at least in part on the verbal input.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a schematic illustrating a conceptual partial view of an example computer program product that includes a computer program for executing a computer process on an example device.

DETAILED DESCRIPTION

Figure 1:
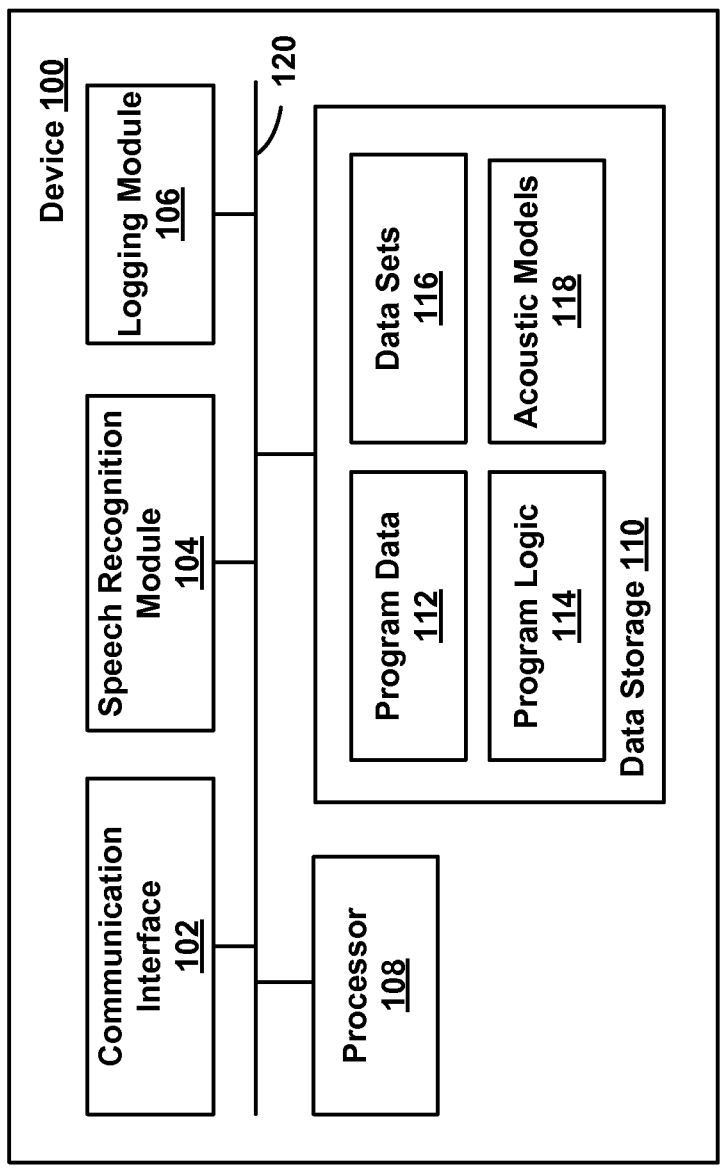
FIG. 1 illustrates a block diagram showing some components of an example device.

In the following detailed description, reference is made to the accompanying Figures. In the Figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The following detailed description generally describes systems and methods for receiving applications. Within example implementations, the systems and methods may enable a device to install and execute applications based on a received input. In particular, a device, such as a wearable computing device or mobile device, may receive input in some format from a user and/or another source (e.g., computing system). The input received by the device may exist in various forms, such as textual input or a vocal request, for example. For example, the received input may be a request or command for the device to execute a particular function, which may require the device to discover and install an application capable of executing the particular function.

In some instances, the device may already have an application installed this may be capable of executing the function as requested by a received input. However, in other instances, the device may need to discover and access (e.g., download) an application or applications that may be capable of executing the function.

In an example implementation, a device may parse a received input as one technique used to recognize any keywords that may serve as a base for searching and identifying applications capable of completing functions related to the received input. In particular, the device may analyze the received input using speech recognition software and/or other processes to identify portions of the input that may be used to request appropriate applications that relate to the received input. In another example implementation, the device may determine keywords through other analysis means, such as word-recognition that may be executed by a programmed classifier.

After recognizing useful keywords within a received input, the device may search for applications associated with the particular recognized keywords. In some instances, the device may be configured to search for a predefined threshold or number of applications that best associate with the particular keywords. The device may be configured to change the number of applications or may enable a user to change the predefined threshold or number, for example.

In some cases, the device may determine that an application installed on the device within memory may be capable of executing tasks based on the identified keywords. In that case, the device may provide instructions to the installed application to execute a function relating to the received input. In particular, the installed application may execute the functions as indicated through the received input without requiring additional input from the user and/or another source. In such an example, the device may provide instructions to execute the application in a way that fulfills the original request or command received within the input immediately upon receiving the input without requiring additional inputs.

However, if the device determines that it may not already have any applications capable of completing functions based on the received input (e.g., user request), the device may be configured to query an application database or another source in order to access useful applications based on the recognized keywords within the received input. The device may access applications via a wired or wireless connection, for example. When searching for applications capable of performing functions related to the received input, the device may identify and use relevance levels that represent the applications relevance to the searched keywords for each of the applications. For example, an application that executes functions that match all of the keywords to a high degree may be likely more relevant (e.g., higher relevance level) than an application that executes functions that only match a portion of the searched keywords.

In some implementations, the device may give more weight (e.g., priority) to particular keywords over other keywords when utilizing the keywords to search for applications. By giving more priority to particular keywords, the device may search for applications that execute functions based on the main purpose of the received input.

Based at least in part on the relevance of applications associated with the recognized keyword, the device may determine a priority list for the applications that may have been identified during the search. Using a priority list may allow a device to provide preferred applications to the user and/or source for selection. For example, arranging the applications based on a priority list may allow a user to focus upon the more relevant applications rather than searching through a variety of applications.

In an example implementation, the device may consider additional factors that may affect the way the priority list may be developed for the identified applications. Using additional factors may allow the device to further organize the applications in a manner that assists the selection of an application to execute the particular function wanted as indicated by the received input. Examples of additional factors may include, for example, factoring the popularity of each application according to the total number of downloads, the cost to download the respective applications, the reviews associated with the respective applications, and/or the promotion price a developer may pay to raise the priority level of a respective application. The device may provide applications in an order that may not depend on the relevance of applications to the keywords.

In a further aspect, the device may be configured to provide the applications for display for a user to select. The device may display the applications in an arrangement that clearly reflects the priority list of the application. For example, the device may display the applications in a numbered order that ranks applications or organizes applications based on the priority list previously determined by the device. Thus, a user and/or source may be able to recognize the applications that may be more favorable for the particular requested function than the other applications.

Furthermore, the device may enable the selection of an application through various user interfaces, such as allowing selection via vocal command or physical touch. In one example implementation, the device may receive input from a user through motions (e.g., hand movements), which may be captured by a sensor of the device. Example motion movements may be based on a sensor capturing specific movements intended to serve as an input within an input application from a user's eye, hand, fingers, etc. The device may receive motions as inputs using functions and sensors configured to capture the motions. The different motions received by the device may correspond to specific function requests.

Upon the selection of the application, the device may install the application and open the application immediately after installation. In particular, rather than requiring an additional input from the user to open the application, the device may complete installing the application and open the application to execute functions based on the originally received input.

In a further aspect, the device may receive additional input from the user subsequent to installing the application that may contain keywords that relate to the installed application. In response to determining that the input includes keywords associated with the previously installed application, the device may open and execute the application without requiring additional commands from the user. The device may run the application from memory and fulfill the command or request from the user without requiring additional user input and/or performing another installation process.

Systems, methods, and devices in which examples may be implemented will now be described in greater detail. In general, described methods may be implemented by various types of computing devices or components of the devices. In one example, a system may include one or more servers, which may receive information from and provide information to a device, such as a mobile phone. However, the described methods may also be implemented by other computing devices, such as a personal computer, a wearable computing device, or a mobile device, among others. Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

Referring to the Figures, FIG. 1 illustrates a schematic drawing of example device 100. The device 100 may be any type of device capable of carrying out the functions and methods discussed herein. Example devices may include a computing device, a mobile phone, a tablet computing device, and a wearable computing device, etc. A wearable computing device may enable a user to execute functions using the device through a more hands-free approach. Examples of wearable computing devices may include head-mountable devices (e.g., glasses), watches, necklaces, or other types of wearable devices.

In the example schematic drawing illustrated in FIG. 1, the device 100 includes a plurality of components. Other example schematic drawings may exist as well and may include more or less components. In some example implementations, some components configured to operate with device 100 as illustrated in FIG. 1 may be distributed across multiple computing devices or may be situated remotely and accessed via a wired or wireless connection. However, for the sake of the schematic drawing example shown in FIG. 1, the components are shown and described as configured within the example device 100.

As previously indicated, an example device may include various system components and/or sensors. In the example illustrated by FIG. 1, the device 100 may include a communication interface 102, a speech recognition module 104, a logging module 106, a processor 108, and data storage 110. To further illustrate, the data storage 110 shown in the example device 100 may include program data 112, program logic 114, data sets 116, and acoustic models 118. The device 100 may include other combinations of components and may further include more or less components in other examples. Furthermore, the data storage 110 may include additional components, which may use various types of memory. In addition, all or some of the components illustrated in FIG. 1 may be linked together by a communication link 120, which may exist as a wired and/or wireless link between the various components.

Figure 2:
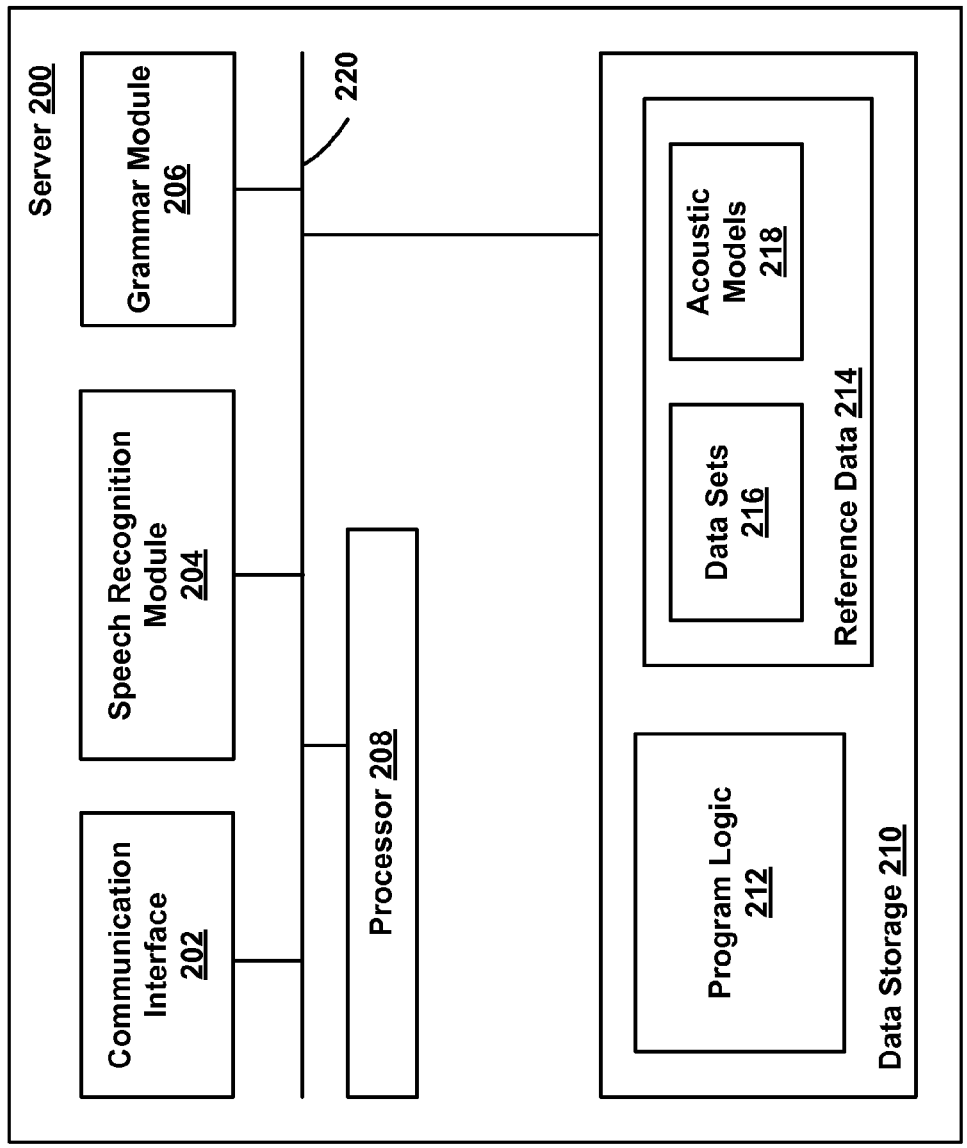
FIG. 2 illustrates a block diagram showing some components of an example server.

In some examples, the device 100 may also include various hardware or software components to enable communication within the device 100 and between the device 100 and another computing device (not shown), such as the server shown in FIG. 2. For example, the device 100 may use various components of hardware such as transmitters, receivers, and antennas.

In one aspect, the device 100 may be configured to include the communication interface 102, which may provide communications means for the device 100. The communication interface 102 may be configured to capture and provide information between device 100 and other devices. For example, the communication interface 102 may be configured to receive input data from other computing devices, and may also be configured to send output data to the computing devices. The communication interface 102 may also receive information for the device 100 to process from a user in various formats, such as text, vocal inputs, motion inputs captured by sensors, etc.

In a further aspect, the communication interface 102 may also maintain and manage records of data received/sent by the device 100. In other examples, records of data may be maintained and managed by other components of the device 100. The communication interface 102 may be configured to perform additional functions as well.

As previously indicated, the example device 100 may receive an input from a user and/or another source. The device 100 may provide the input (e.g., voice command) to the speech recognition module 104, which may process the input to produce an output (e.g., a textual string based on input). The developed output may include one or more text strings and may further also include associated confidence levels configured by the speech recognition module 104 based on the processing of the input. In addition, the outputs produced by the speech recognition module 104 may also include other information relating to the received input.

In addition, the device 100 may also include a speech recognition module 104, which may also be referred to as a text recognition module. The speech recognition module 104 may be configured to execute processes corresponding to recognizing speech (e.g., text strings) within input received by the device 100. For example, the speech module 104 can be used to convert a voice input, such as a search query, into a text string that may be sent to a search engine to obtain search results (e.g., search for applications relating to a received input). The potential uses for voice control may include many possibilities and the examples described herein should not be viewed as limiting.

During operation, the speech recognition module 104 may be configured based on a respective user or may be configured to execute for a wide array of respective users. In some instances, the speech recognition module 104 may adapt to language and delivery of a specific user that may typically use the device 100. Moreover, in some examples, after an input is received by the device 100, processes relating to speech recognition may be executed remotely at a network server (e.g., a server or cluster of servers on the Internet). In such an example, the speech recognition module 104 of the device 100 may be configured to communicate with a remote speech recognition system (e.g., through data transfer). Within an example implementation, the speech recognition module 104 may receive an input from the device 100 in an analog or digital format, which may include some background noise in addition to the received input.

In addition, in response to receiving some vocal input, the speech recognition module 104 may utilize feature analysis techniques to produce feature vectors from the received input. The speech recognition module 104 may include components configured to execute feature analysis or a separate component apart from the speech recognition module 104 may be configured to perform the process. Likewise, the speech recognition module 104 may also perform a pattern classification process to determine patterns based on a received input. In some instances, another component of the device 100 may be configured to perform pattern classification processes as well.

Within examples, a respective feature vector determined by the speech recognition module 104 may include temporal and/or spectral representations of acoustic features of at least a portion of the originally received input. For instance, the speech recognition module 104 may utilize the feature vectors during its processes to develop text strings based on the received input. In addition, a determined feature vector may include different components useful for speech recognition, such as Mel Filter Cepstral coefficients, Perceptual Linear Predictive coefficients, Relative Spectral coefficients, or Filterbank log-energy coefficients of such a portion, for example.

The speech recognition module 104 may also be configured to sample and quantize the received input, divide the received input into overlapping or non-overlapping frames of time (e.g., 15 milliseconds), and/or perform spectral analysis on the frames to derive the spectral components of each frame. In addition, the speech recognition module 104 or a similar component may be configured to perform processes relating to noise removal.

The speech recognition module 104 may execute pattern classification process to determine a sequence of the feature vectors from the feature analysis module and produce, as output, one or more text string transcriptions of the received input. Each transcription may be accompanied by a respective confidence level indicating an estimated likelihood that the transcription is correct (e.g., 80% confidence, 90% confidence, etc.).

To produce the text string transcriptions, the speech recognition module 104 may be configured to include, or incorporate aspects of acoustic models, such as acoustic model 118, a dictionary, and/or language models. The device 100 may utilize the text string transcriptions to further execute functions.

In addition, the conceptual illustration shows the example device 100 may include data storage 110. The data storage 110 shown in the example device 100 may include program data 112, program logic 114, data sets 116, and acoustic models 118. The data storage 110 may exist on the device 100 or may exist remotely on a server available for access by the device 100. The program data 112 and program logic 114 may be configured to execute various functions for the device 100. The program data 112 and program logic 114 may be configured to assist in installing and executing applications, for example. In some instances, the data sets 116 may vary within examples.

Likewise, the device 100 may include data storage 110 for various applications, which may be used to execute functions based on received requests. The device 100 may communicate with remote applications via a wired and/or wireless link without installing the applications directly on the device. In addition, the device 100 may store information relating to applications, such as form fields and credit card numbers, which may be used by the applications. The device 100 may further be configured to access multiple applications in real-time and may provide various instructions to the applications. The applications may exist as mobile applications, which may have been developed by other devices.

In addition, the device 100 may include one or multiple acoustic model (e.g., acoustic model 118), which may use software and/or other processes to create statistical representations of the sounds that may make up words within received input. A speech recognition engine (e.g., speech recognition module 104) may assist the acoustic model 118. The acoustic models 118 may be configured based on received audio recordings of speech and text transcriptions, for example.

The acoustic model 118 may have been created by taking prior recordings of spoken utterances and the textual transcriptions of the spoken utterances to generate statistics. Likewise, the acoustic model 118 may be created using other techniques. In addition, a respective acoustic model may be configured to recognize a particular language, such as English, Korean, French, etc. In some instances, the acoustic model 118 may be configured to recognize multiple languages.

In one example implementation, the acoustic model 118 may be configured to determine probabilities that determined feature vectors or text strings may have been derived from a particular sequence of spoken words and/or sub-word sounds. The acoustic model 118 may be configured to assist in processing the received input in addition to the speech recognition module 104.

Furthermore, as shown in FIG. 1, the example device 100 may include a communication link 120. Within examples, the communication link 120 may operate as a wired connection or a wireless connection. For example, the communication link 120 may be a wired serial bus such as a universal serial bus or a parallel bus. Other types of communication links may be used as well.

FIG. 2 illustrates a schematic drawing of a server 200, which may communicate with devices, such as the example device 100 shown in FIG. 1. As illustrated, the server 200 may include various components, such as a communication interface 202, a speech recognition module 204, grammar module 206 and processor 208. Similarly, the server 200 may further include a processor 208, for example. Further, the server 200 may also include a data storage 210, which may be configured with program logic 212 and/or reference data 214. In particular, the reference data 214 may contain data sets 216 and/or an acoustic model 218 or models. In addition, some or all the components within the server 200 may be linked by a communication link 220, which may connect the components via a wired or wireless communication.

During operation, the server 200 may communicate with one or multiple devices in a network system. In addition, the server 200 may be configured to execute tasks with and/or for other servers or devices. The components within server 200 may exist outside of server 200 and/or may be combined into fewer components or split into more components. Furthermore, the server 200 may further include additional components not discussed herein.

The communication interface 202 within the server 200 may be configured to allow the server 200 to communicate with external devices or internal communication between components. Likewise, the communication interface 202 may be configured to allow one or more users to communicate with the server 200.

Along with the communication interface 202, the server 200 may also include a speech recognition module 204, which may be internal or external to the server 200. The server 200 may be configured to communicate with the speech recognition module 204 through the communication interface 202. The speech recognition module 204 may be configured to receive input, such as spoken utterances, and determine transcriptions for the received spoken utterances in response. The transcriptions may be in a device-readable form so that server 200 or another computing device may receive the transcriptions from the speech recognition module 204 and have the ability to read or execute the transcriptions properly.

Further, the speech recognition module 204 may be configured to determine transcriptions through the use of a speech recognizer, probabilities and statistics, comparisons with prior transcriptions and/or a stored vocabulary dictionary. In some examples, the speech recognition module 204 may be configured to operate differently than the speech recognition modules inside devices of users. For example, the speech recognition module 204 may be configured to use more time and apply additional comparison algorithms to further remove transcriptions caused through error in order to improve accuracy for use by the device. In some example methods, the speech recognition module 204 may be configured to operate as a text recognition module. Similarly, the speech recognition module 204 may be configured to receive different types of input, such as spoken utterances or textual input, from various devices.

In some examples, the speech recognition module 204 may be a speaker-dependent module or a speaker-independent module, or a combination of the two types. As discussed above, the speech recognition module 204 may be configured to operate as a Hidden Markov Model (HMM), dynamic time warping (DTW) based speech recognition module, a neural network, or a hybrid of these systems.

Additionally, the speech recognition module 204 may be configured to use one or more algorithms to process inputs, such as identifying one or more grammar-based textual patterns, which may include one or more grammars. The speech recognition module 204 may be configured to use grammars according to the speech recognition grammar specification (SRGS) and may communicate with the grammar module 206 to execute accordingly. Further, grammars may be produced and/or stored by a grammar module 206 as shown in FIG. 2. A grammar may include a set of word patterns which may provide the speech recognition module 204 with information for determining meanings behind input from a user. In some examples, a device may be configured to use a speech recognition module to perform some tasks on the input before sending the input to the speech recognition module 204 of server 200. Grammars may be produced and/or stored at the device as well.

In the example illustrated by FIG. 2, the server 200 may contain a processor 208. The processor 208 may be configured to execute the various functions and methods described herein. In addition, the processor 208 may execute other functions or methods. In some examples, the server 200 may contain more than one processor that may communicate with one another. The processor 208 may be configured to carry out the instructions of one or more computer programs.

In addition, the server 200 may be configured to include data storage 210, which may include volatile or non-volatile types of memory and may be configured with different types of mutability. In some implementations, the data storage 210 may store program logic 212 executable by the processor 208. The data storage 210 may also store reference data 214. Other components may be stored in data storage 210 as well. Within the data storage 210, the program logic 212 may contain one or more instructions for the process 208 to execute. Similarly, the program logic 212 may be capable of being changed.

Moreover, the data storage 210 may include memory for applications and/or may include a database of applications that may be able to be transmitted via a wired and/or wireless link. The server 200 may communicate with other entities, such as mobile devices, and may transmit applications and other types of information to the devices.

Further, the server 200 may be configured to use reference data 214 based on communication with other servers or devices. In addition, the reference data 214 may be used by one or more components of the server 200, such as the speech recognition module 204. The reference data 214 may include one or more data sets 216. The one or more data sets 216 may be used to adapt an acoustic model to specific conditions. Example data sets may include device data sets, weather data sets, and speaker data sets, etc. In some instances, the data sets 216 may differ from each other for a plurality of reasons, including the location of the device, specific environmental conditions at that location, and the speaker using the device.

Similarly, the reference data 214 may also include one or more acoustic models 218. An acoustic model may be configured to give a probability of a given time slice of input audio matching a particular phoneme. Spoken utterances may be broken down into various phonemes, which may be small segmental units of sound used to form meaningful contrasts between utterances. A speech recognition module may be configured to use an acoustic model to find the probabilities of particular phonemes depending on the received spoken utterances, and thus recognize the spoken utterances. The acoustic models 218 may have been created by the server 200 or another entity by taking prior recordings of spoken utterances and the textual transcriptions of the spoken utterances to generate statistics. In addition, each acoustic model may be configured to recognize a particular language, such as English, Korean, French, etc. In some examples, the acoustic model may recognize multiple languages.

Furthermore, the acoustic models 218 may be capable of being changed or adapted by one or more data sets. For example, a speech recognition module may use an acoustic model and a data set to further adapt that acoustic model to adapt to the conditions set forth in the data set. The acoustic models 218 may consist of other acoustic models that a system may obtain to adapt an acoustic model for a particular language to environmental conditions. Additional examples may exist as well.

The example in FIG. 2 further shows the server 200 comprising a communication link 220. The communication link 220 is illustrated as a wired connection; however, wireless connections may also be used. For example, the communication link 220 may be a wired serial bus such as a universal serial bus or a parallel bus. A wired connection may be a proprietary connection as well. Likewise, the communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

Figure 3:
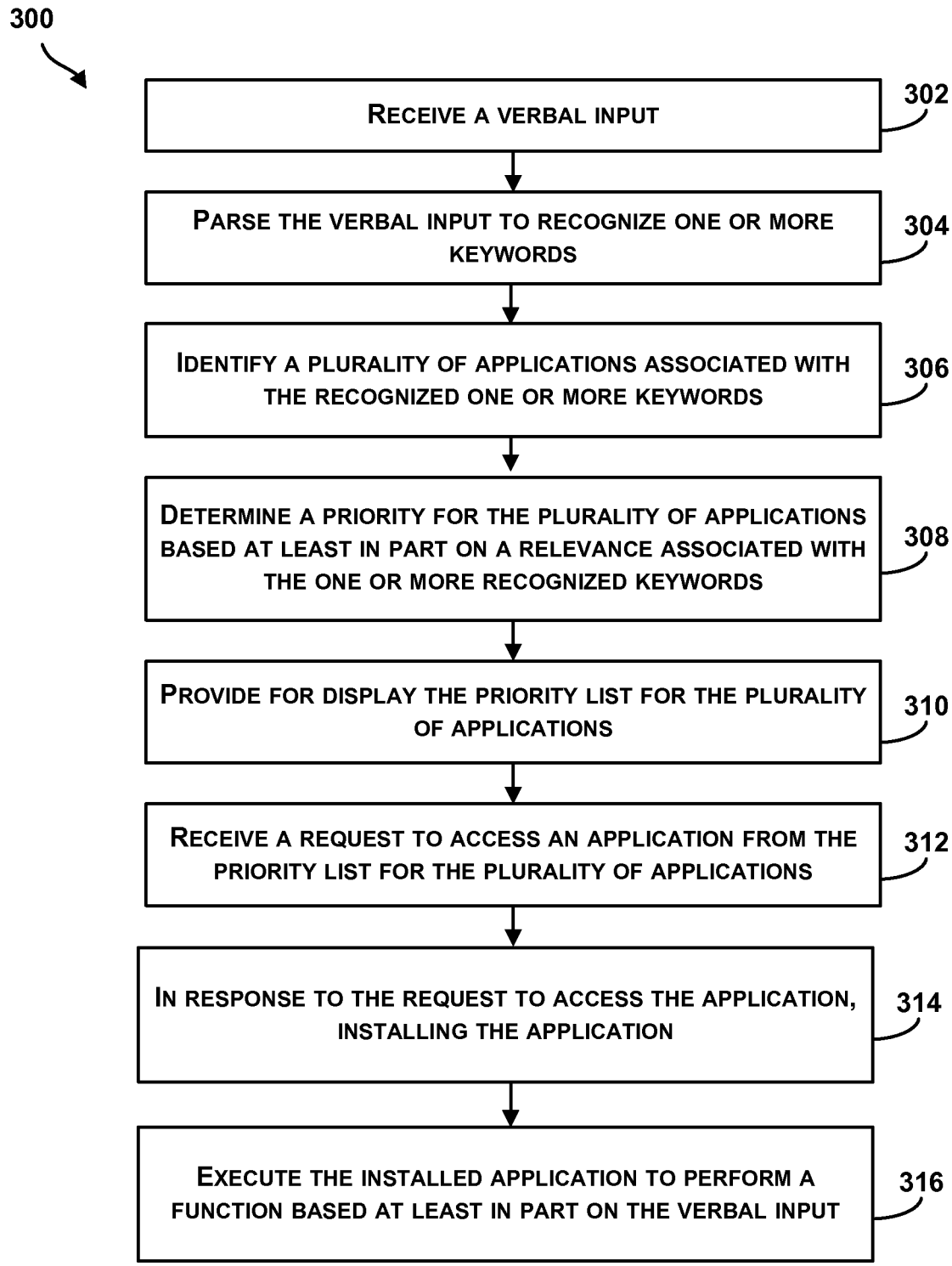
FIG. 3 is a flow chart of an example method for installing and executing applications.

FIG. 3 is a flow chart of a method 300 for installing and executing applications. The method 300 may include one or more operations, functions, or actions as illustrated by one or more of blocks 302-316. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

Furthermore, for the method 300 and other processes and methods disclosed herein, each block in FIG. 3 may represent circuitry that is wired to perform the specific logical functions in the process.

At block 302, the method 300 may include receiving a verbal input. A device, such as a mobile phone, wearable computing device (e.g., glasses), tablet computing device, etc., may receive a verbal input from a user. In some instances, a server, such as server 200, may be configured to receive the verbal input, which may receive in the input from the computing device. For illustration purposes, a device performing the method 300 may exist as any type of entity or device capable of receiving verbal inputs.

In particular, a device performing the method 300 or similar processes may receive a verbal input from a user, multiple users, and/or other devices, for example. The verbal input may be any form of verbal communication, including words, phrases, utterances, or the like. In addition, the verbal communication may also include indications of intonation, tone, pitch, inflection, etc. As previously indicated, the verbal communication may originate from a user(s), electrical device, and/or electro-mechanical device and may be received by a computing device, such as a mobile telephone, a personal digital assistant, etc. Furthermore, the device may send the verbal input directly or indirectly to a linked server, which may include wired or wireless transmission.

In another example implementation, a device may be configured to receive an input in the form of text or motion. The textual input may cause the device to derive information from the input in a similar manner as receiving a verbal input may cause the device to execute. The text may be received by a device via a keyboard or some other form of user interface. In addition, the device may receive motion input from a user or other source by capturing the motion with a sensor. For example, the device may track hand and/or finger motion of a user to determine input to use for processing. Likewise, the device may receive a combination of text and verbal input from a user, for example. The device may be configured to format the verbal input into text prior to analyzing, for example.

FIGS. 4A-4D illustrate an example device performing a process for installing and executing applications. For example, the device may perform the method 300 to install and execute an application. FIGS. 4A-4D may represent different steps in a process developed for installing and executing applications based on a received input. In addition, additional or less features may exist in addition to FIGS. 4A-4D that may be executed by the device and/or other example devices or servers.

Figure 4A:
FIGS. 4A-4D show a conceptual illustration of an example computing device installing and executing an application.
Figure 4B:
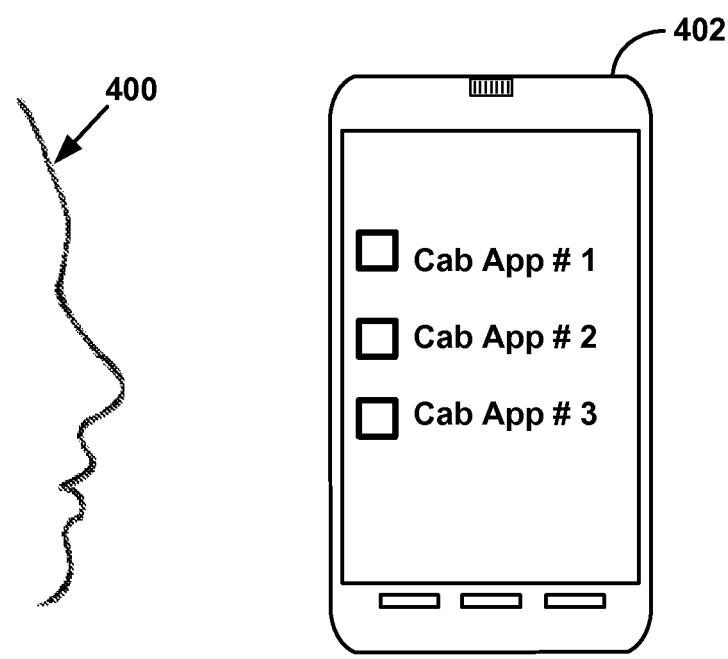

FIG. 4A illustrates an example device 402 receiving a verbal input from a user 400. As discussed, the device 402 may receive input from the user 400 in a verbal format (e.g., voice command) or may receive input configured in another format (e.g., text). In the example illustration shown in FIG. 4A, the device 402 may receive input in the form of a verbal command "call me a cab" from the user 400. Although the example illustrates the device 402 receiving the input from the user 400, the device 402 may receive the input from other sources, such as multiple users and/or other entities.

In addition, within the example shown in FIG. 4A, the device 402 may reflect the reception of the input by displaying the words on the screen of the device as shown in the illustration. The device 402 may display the words after determining the correct words to display via language algorithms and/or other techniques. In other examples, the device 402 may not display the received input on the screen. Other visuals relating to the reception of an input by a device may exist as well.

In a further aspect, the device 402 may repeat the input in an audio format for the user 400 to hear or may reflect the reception of the input via other means. The device 402 may use a combination of audible and/or visual signals to relay to the user that the device may have properly received the input. In the case that the device 402 shows an error rather than the proper input, the device 402 may be configured to provide means for a user to cancel and/or signal that the device 402 may have erred during its reception of the initial input.

Referring back to the example method 300 shown in FIG. 3, at block 304, the method 300 may further include parsing the verbal input to recognize one or more keywords. A device may analyze any received input (e.g., verbal, text, etc.) to recognize one or multiple keywords that may be utilized to search for applications. The example device performing the method 300 may utilize various techniques and/or search software to identify possible keywords that may prove helpful to select useful applications. For example, a device may identify keywords based on the keywords existing as common verbs and/or nouns within the received input. A server may receive the input from the device and may identify possible keywords by utilize search algorithms and/or software as well.

In one aspect of keyword recognition, a device and/or server performing some type of recognition may utilize functions relating to parsing phrases through using keyword libraries stored within memory. The stored libraries of keywords may be stored within a cloud and/or may be built via a classifier within the device, for example. The device may use various comparison processes to compare received inputs to databases made up by potential keywords. The device may recognize keywords based on various factors associated the received inputs. In addition, a device may make a determination based on the identity of the keyword. In a further recognition technique, a device may compare recognized keywords to a database of keywords to identify a meaning associated with the keyword.

In an example, to recognize keywords, the computing system may use a variety of voice recognition algorithms and/or utilize other keyword recognition techniques. For example, in another aspect for determining keywords, the device may determine a probability and/or likelihood of success associated with identified keywords. Likewise, a device may use a grammar function, which may be used to aid in recognizing keywords and/or phrases. The grammar function may be provided with the keywords, thereby allowing the grammar function to be used with the application and/or website associated with the application.

In another example implementation, a device and/or server may use speech recognition algorithms to detect, determine and/or otherwise identify an inflection, pitch, intonation, tone, etc. that may be associated with the received keyword and/or phrase. For example, the server may determine an inflection and use the determination to identify a tense, person, gender, mood, etc.

In a further example implementation, the device may identify a pitch and may use the pitch to order sounds using a frequency related scale. Further, a device may detect and use intonation to determine a variation of pitch. Moreover, the device may determine a tone and use the tone to determine a lexical or grammatical meaning associated with the keyword and/or phrase, for example. The pitch and/or tone may enable the device to parse a received verbal input, for example.

Furthermore, a device may use some form of speech recognition to assist in identifying keywords in a received input. For example, the device may be configured to perform processes related to automatic speech recognition, which may analyze a user's specific voice and use it to fine tune the recognition of the speech. Likewise, the device may utilize other techniques and/or processes relating to audio mining, which may include identifying any speech within received audio. The device may perform processes relating to Large Vocabulary Continuous Speech Recognizers (LVCSR) and/or phonetic recognition, for example. The device may utilize other forms of speech analytics as well, which may include extracting keywords from received phrases.

At block 306, the method 300 may also include identifying a plurality of applications associated with the recognized one or more keywords. Utilizing the various recognized keywords identified from within a received input, a device may be configured to search for applications that may have at least a minimum connection to the keywords. The minimum connection may vary within examples, with some examples requiring a high degree of relevance between the identified applications and recognized keywords. For example, a device may identify applications based on the recognized keywords using some form of search software that may determine the functions of the applications and determine an association between the functions of the applications and the received keywords.

In one aspect, a device and/or another entity may perform processes relating to identifying applications associated with a recognized keyword or keywords, which may include receiving assistance from the application database. A database that holds the various applications may provide applications to the device based on the recognized keywords, for example. In some instances, a device and/or server may identify applications by comparing recognized keywords to a database of keywords that may be associated with the applications, websites, and/or action data, etc.

In addition, a device may be configured to search independently for applications for each respective keyword. For example, a device may perform a search function for applications relating to a first keyword and may perform another search function for a second keyword received in an input. The device may be configured to gather a predefined amount and/or threshold of applications, which may limit the number of applications to an amount that displays mostly applications directly associated to the keywords.

In a further aspect, a device may search multiple application databases for applications. The multiple databases may provide different applications that may be capable of performing functions that relate to the originally received input.

At block 308, the method 300 may further include determining a priority list for the plurality of applications based at least in part on a relevance associated with the one or more recognized keywords. After identifying multiple applications associated with a respective keyword or keywords, a device may determine a priority for the multiple applications. In particular, a device may arrange the identified applications that may be useful based on a priority associated with the multiple applications. In particular, the device may rank the applications based on a variety of factors associated with the applications, such as the degree each respective application may be associated with the keywords derived from the original input. Examples of factors may include determining a priority based on a relevance level associated with a keyword matching an application or may include determining a priority based on a payment associated with a keyword matching an application, etc.

Further, a device may rank the applications based on the respective developers and/or companies of the applications. For example, a device may prioritize applications to rank applications corresponding based on the developers and/or companies that the device's user selects to install applications from more often. In other examples, the device may determine a priority of the searched applications based on other preferences derived from selections made by the device's user. In addition, a device may determine the priority for the applications using a matching module at the device and/or server.

In one example implementation, the process of prioritizing applications and/or websites may include a device and/or server determining all or a subset of the applications and/or websites that may be associated with the recognized keyword. Within the implementation, the device and/or server may also determine a relevance of the keyword associated with one or more applications and use the relevance in full or in part to prioritize the applications.

Moreover, the device and/or server may determine how much, if any, payment was received for the keyword and/or phrase to be associated with the application and/or website. This determined payment amount may be based on an average monetary amount associated per keyword and/or phrase, a subscription level, a weighted payment, a time, a date, a geographic location, etc. In some instances, the payment amount may be used to determine the relevance of the keyword associated with the applications. Optionally, a device and/or server may use the payment amount as an independent factor that may be used alone or in conjunction with one or more factors, such as the relevance of the keyword associated with the application, in determining the priority associated with the application.

In another example, a device and/or server may select multiple keywords to be associated with respective applications. The device and/or server may determine an order based on a charge paid per keyword, for example. The device may use different factors associated with particular keywords.

In addition, a device may determine a priority list for a number of identified applications based on user reviews and/or whether applications have been used before on the same device or a device within a personal network, for example. Likewise, the device may determine a priority list based on other signals, such as the device platform that operates portions of the device. Some applications may execute better on a particular device platform, for example. Likewise, the device may determine a priority list based on the frequency applications receive updates. For example, the device may rank applications that are updated less lower overall since the device may want applications that may be regularly updated. The device may determine a priority based on a frequency of use associated with applications as well.

The device may develop a score-based system for ranking applications. The score-based system may take into account various factors, such as the different signals described herein. In addition, the score-based system may also take into account other factors as well.

Further, the device may determine a priority list based on the number of times applications have been previously installed, for example. The device may also use the location of the device as a factor for determining a priority list for applications. Likewise, the device may factor the proximity of other users of applications when determining a priority list for applications. For example, the device may list applications with higher numbers of users in the approximate area over applications that may not be in such a demand. The device may also factor in the cost and/or promotion associated with particular applications for determining a priority list. Promotion cost may relate to advertising or other expenditures, for example. The device may also use links or mentions to particular applications as a factor for prioritizing applications, for example. Other factors or signals may be taken into consideration by a device for determining a priority list of identified applications.

At block 310, the method 300 may include providing for display the priority list for the plurality of applications. A device may be configured to provide the list of applications to an entity and/or the user based on the determined priority. For example, the device may organize the applications in a horizontal list and provide the list to the user showing the most relevant applications foremost. Likewise, the device may provide the applications on a screen of the device or in an audible output, for example. The device may use a combination of audible and/or visual representations to provide the priority list to a source and/or user. The device may use numerical symbols or other distinguishing flags to represent the priority list for the applications, for example.

In other implementations, the device may display the applications in other formats that may be based on the priority levels of the applications. For example, the device may rank the applications and may show the relevance levels of the respective applications based on the recognized keywords. The rankings may include some form of indication that allows a source/user to understand the context of the priority list (e.g., numbers next to applications).

Referring back to the example implementation shown in FIGS. 4A-4D, FIG. 4B illustrates the device 400 displaying the priority list of the applications for the user. In the example device 402 shown in FIG. 4B, the screen of the device displays the applications in a top-down list, which shows the top ranked applications at the top and the lower ranked applications listed below. In other examples, the device 402 may list the applications in a different manner, such as a horizontal ranking. Further, the device 402 may be configured to visually recommend (e.g., highlight) applications based on the priority list. For example, the device 402 may indicate that a respective application may have the best reviews and/or the purchase costs or other costs associated with the respective application may be lower than the other applications. Likewise, the device 402 may indicate other information to the user, such as showing that the functions of respective applications of the priority list may be associated to a high degree with the recognized keywords. Other formats and signals may be used by the device to display the priority of applications to the user.

In addition, the device may further show other information associated with the respective applications. For example, the device may show costs to purchase the application or functions within the application and/or user-ratings associated with each application. The extra information may enable a user and/or source to make a selection of an application based on more than just the title of the application.

Likewise, the device may further show other information associated with the applications specific to the received input. For example, the device 402 may show the distance away of the nearest cabs and/or the cab company based on the applications, which may enable a user to select a cab application based on availability, etc. Similarly, the device may indicate the hours of the business and/or the costs associated with participating in business transactions with the business represented by the application (e.g., hours the cab companies operate). In this illustration, the device may also show the rate of money that each cab company may charge, which may enable a user to determine a price range based on the different cab applications. Other information may be presented by the device that may be associated with the respective applications.

In other example implementations, the device may show the availability of the company represented by the application. For example, the device may indicate the number of open tables available based at the current moment for restaurant applications. Other information may be searched for and provided by the device to go along with displaying the applications for selection.

At block 312, the method 300 may further include receiving a request to access an application from the priority list for the plurality of applications. A device may receive a request to access an application from another device, entity, and/or user, for example. The request may be received by a device and/or server through various interfaces. For example, a device may accept verbal input to select an application from a user and/or other source. The device may also accept motions captured by a device sensor (e.g., finger movements) and/or text as means for indicating that the user and/or source selected a particular application.

In some examples, the device may allow a source and/or user to select multiple applications, which may be utilized by the device. Likewise, the device may be configured to repeat prior steps in the case that the source and/or user indicate that access may not be wanted for any of the displayed applications (e.g., user rejects all the applications within the priority list of applications). The device may determine that a rejection of the applications may qualify as an indication that the recognized keywords may have been misread or some other error may have occurred (e.g., received improper input). Therefore, the device may request another input from the user and/or source to start over in the application search process. In some instances, the device may require the user and/or source to provide input in another form than the input format initially received. For example, the device may determine that the user did not select any of the applications accessed as a result of keywords derived from a vocal input. In response, the device may require the user to provide the next input in type or another format to ensure that the device accurately derives the wanted keywords.

In another implementation, the device may continue to show the next group of found applications in the case that the user and/or source did not request access to any shown applications within the first group of applications displayed. For example, the device may display a priority list including five applications initially, but upon not receiving an access request to access any of the five applications, the device may be configured to provide another five applications to the user and/or source for selection. The second set of applications may be ranked lower than the initial set of applications on the determined priority list of applications. Other examples of application display may exist as well.

Referring back to the example shown in FIGS. 4A-4D, FIG. 4C illustrates the device 402 receiving a request to access an application from the list of applications shown in the device's screen. As shown, the user 400 indicates selection of "Cab App #2" via a vocal input to the device 402. In other instances, the device 402 may receive selection of the application via text, motion (e.g., hand movements of a user), vocal, or some other format.

To indicate that the second application listed had been selected by the user 400, the device 402 filled in the box next to "Cab App #2" with an "X" to indicate that this application was selected. In other implementations, the device 402 may indicate the application selection via other formats and/or techniques. For example, the device 402 may highlight the application and/or may repeat the application's name in an audio format for the user to hear after the application has been selected. In some instances, the device 402 may not perform any actions in response to receiving a request to access for a particular application.

Figure 4C:
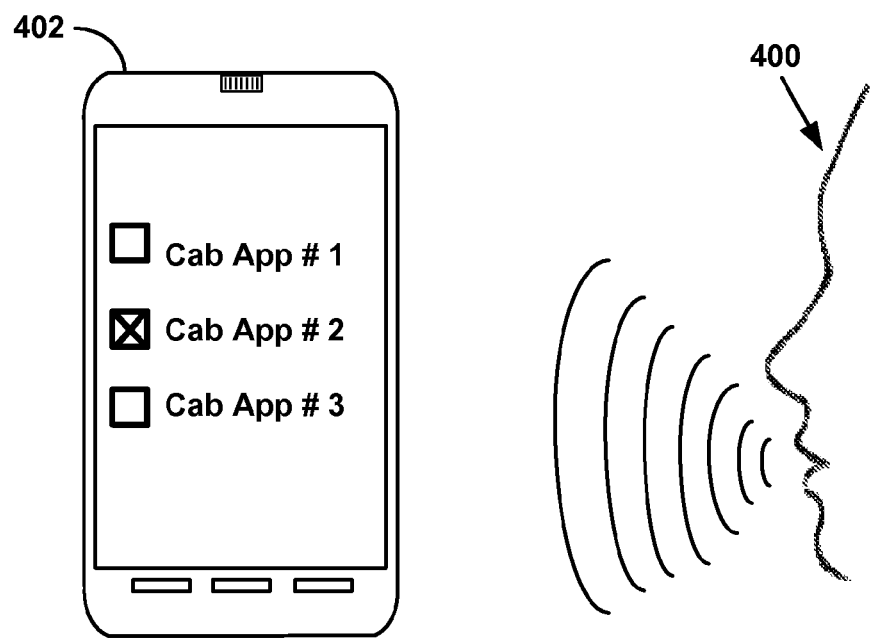

In addition, the device 402 shown in FIG. 4C may be configured to allow the user 400 to select multiple applications. For example, the device 402 may have allowed the user 400 to select "Cab App #1" or "Cab App #3" in addition to "Cab App #2". Other combinations of selections for applications may exist as well.

At block 314, the method 300 may also include, in response to the request to access the application, installing the application. An example device performing the method 300 or a similar process may be configured to install a respective application based on receiving a request to access the application. For example, a device may provide the applications for display to a user and may receive an input from the user that indicates which application the user wants to install and utilize. After receiving the request to access a particular application, the device may install the application in order to enable the application to perform functions for the device.

Various techniques and/or software may be utilized by a device to install an application. For example, installing an application may involve downloading the application from a source, such as another device or server. Likewise, the device may download the application from memory and/or other types of sources. The device may use a wired connection and/or wireless connection to receive the application for installation.

In one aspect, a device may be configured to prepare the application for installation, which may enable the application to execute functions for the device. A device may include hardware and/or software components that may be configured to act as an installer, which may complete the installation process. The installer may determine whether or not the device meets system requirements for installing the particular application. Likewise, the installer and/or some other component of the device may check for existing version of the software and/or updates of the software associated with the application.

A device may be configured to create and/or update program files and folders for downloading and/or installing an application. The device may store the installed application in various types of memory, which may exist on the device or may exist wirelessly from the device (e.g., cloud). In some instances, the device may add configuration data, such as configuration data files, registry entries, and/or environment variables.

In some instances, the device may configure links, shortcuts, and/or bookmarks to form paths to the installed application. The device may configure components of the device to operate automatically corresponding to the application. In addition, the device may execute any operations associated with the application's activation, such as providing information to the application.

Further, a device may be configured to create access to an application rather than install the application. For example, the application may exist in memory on a server and may execute functions for devices that obtain access to that application. Rather than installing this type of application, the device may acquire access and utilize the application in a similar manner as if the device had installed the application onto its memory.

At block 316, the method 300 may include executing the installed application to perform a function based at least in part on the verbal input. A device or some portion of the device (e.g., device platform) may provide instructions to the installed application to execute a function or multiple functions based on the original input received from the device. For example, the device may control the installed application and/or may provide instructions to components of the device or to the applications to execute according to the vocal and/or text input received from a user and/or other entity.

The device may be configured to execute a function based on the original input received that initiated the device to perform the application search and installation process. The device may be configured to install the application and execute a function with the application immediately after installing the application. In particular, the device may not require additional input requesting the application to execute functions, but may rather install the application and upon installation, executing the functions derive from the original input. The device may install the application and execute a task as requested initially from the user and/or other entity without requiring additional inputs in between installing the application and executing the task. In some instances, the device may provide instructions to the application to execute a function according to the original input as the application is installing. For example, the application may be capable of partial or full performance of a function after a few moments of installation rather than requiring the entire installation to complete. Likewise, the device may provide instructions to the installed application to execute a function based on the initially received input after a predefined delay of time (e.g., 5 seconds).

In addition, the device may provide information to the application enable the application to execute the function as indicated by the original input received prior to the application search process. For example, the device may provide contact information, credit card numbers, and/or other types of information to the application to enable the application to execute its function. In some instances, the device may be configured to require a user and/or source to approve the delivery of certain types of information to the application prior to providing the application with the information. For example, the device may allow a user to choose within settings whether the device provides credit card and/or contact information to applications without requiring In some examples, the device may require an additional input after installing the application prior to providing the application with instructions to execute a function. For example, the device may require the user to repeat the original input or provide a confirmation input after the application installed.

Further, the device may execute an installed application to perform a function using information stored in memory. For example, the device may use contacts' information, location information, and payment information (e.g., credit card numbers). Other information may be utilized by the device as well.

Referring back to the example shown in FIGS. 4A-4D, FIG. 4D illustrates the device 402 providing instructions to the installed application "Cab App #2" to perform a function based at least in part on the originally received verbal input "call me a cab". The device 402 may have configured the application "Cab App #2" to execute (e.g., call a cab) immediately after installing.

As shown previously within FIG. 4C, the device may receive input selecting an application to install from the prioritized list of applications. After the device receives the selection to install "Cab App #2", the device may proceed installing the application and cause the application to request a cab via the application's functions without requiring an additional input from the user and/or another entity. The immediate execution enables the device to complete the originally received input quickly without requiring additional input.

Figure 4D:
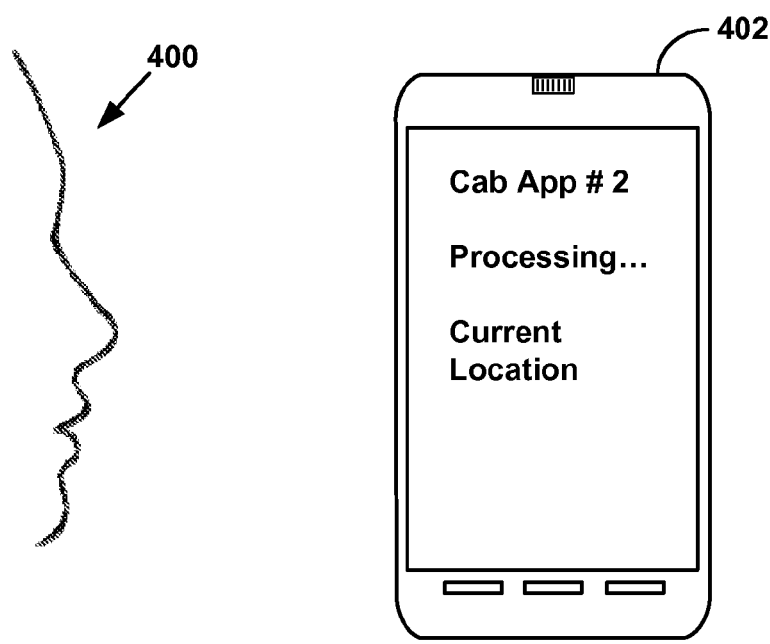

In the example shown in FIG. 4D, the user 400 is shown respectively silent without producing a verbal input for the device 402 to receive. The silent user 400 further illustrates that the device may proceed with executing the original verbal input on the "Cab App #2" without requiring additional input. The device platform or other software within the device may provide instructions to the "Cab App #2" to call a cab according to the originally received vocal input.

In addition, the application may call a cab based on the location of the device, which may include using a global positioning system (GPS). The device may provide other information to the application to complete its task without requiring additional input. For example, the device may provide a location of the device to the application for calling a cab. Likewise, the device may provide credit card information to the application to pay for the cab fare. In some implementations, the device 402 may be configured to receive some form of input from the user and/or source that enables the device 402 to provide the additional information to the particular applications. For example, the device 402 may enable a user to turn off or on providing credit card information to applications.

Moreover, the device platform may utilize other types of information captured from sensors and/or other media, such as the Internet. The application may be configured to utilize additional information in order to execute according to the original input received.

In one example implementation, the device 402 may require additional input prior to allowing the application to execute a function after installation. For example, the device 402 may request confirmation from the user prior to providing instructions to the application to call a cab. In particular, the device 402 may request confirmation for payment of the cab prior to executing the function.

In another aspect, the device 402 may receive an additional verbal input from the user 400, which may be similar to the other verbal input "call me a cab." For example, the additional verbal input may be "I want a cab to come here." The device 402 may receive the verbal input and parse the received input for any keywords that may assist in its application search. For example, the device 402 may identify "want", "cab", "come", and "here" as potential keywords. The device 402 may group some of the keywords together or may identify more or less words as keywords from the received input. For example, the device 402 may group "come here" together as a single keyword, which the device 402 may use for location purposes.

Furthermore, the device 402 may be configured to store input information based on the initial use of the application, such as contact information and/or credit card numbers, for example. Upon receiving subsequent commands and/or other inputs from the user and/or other entity, the device may open the application and execute a function using the stored input information (e.g., credit card information) based on the subsequent command. For example, the device may receive another request for a cab in a subsequent input at a different period of time and may execute a function using the installed application and stored information to request a cab for the location of the device. The device may use the credit card information to pay for the requested cab and may execute all the above functions without requiring additional input from the user.

In some instances, the device may be configured to request approval in order to execute certain functions, such as using a stored credit card to pay for something. Further, in some implementations, the device may require a password and/or other input to enable the use of a stored credit card and/or other information, for example. The device and/or server that receives and installs applications may secure information used by executing functions.

In a further aspect, a device may be configured to receive input and install applications based on the input independently from the device's platform. The device may search for applications using varying algorithms and/or software, which may be configured to obtain applications based on relevance and/or other factors.

In another example implementation, a device may receive a verbal command, "take a note", from a user and/or another entity. Likewise, the device may receive the command in text via a keyboard or another type of user interface. After receiving the command, the device may use various algorithms and/or software to identify keywords within the received input. In particular, the device may recognize "take" and "note" as potential keywords to utilize for searching for applications. In one such illustration, the device may search applications that may execute functions relative to "take" and/or "note". The device may search for a specific number of applications and/or may search for applications that may correspond to the recognized keywords within a threshold relevant level. In addition, the device may obtain visual cues and/or descriptions of the applications for a user to use for decision making.

After receiving information corresponding to the various applications based on an association of the applications with the respective keywords, the device may determine a priority list or some other format to show the priority of the applications to the user and/or other entity. The device may receive applications relating to "take a note", which may include word processing applications, note pads, etc. The device may display the applications based on a priority that factors in the cost of the applications and/or the overall popularity of the applications (e.g., overall number of downloads).

Based on the priority of applications, the device may receive a request to access one or multiple of the applications. After receiving the request, the device may install the applications and provide instructions to the application to execute a function according to the originally receive input, "take a note". Thus, the application may open and provide immediate capability to the user and/or other entity to take a note via the application interface. Furthermore, in an additional aspect, the device may be configured to open the installed application and execute functions corresponding to subsequent inputs that include keywords that may be associated with the application.

In another example, the device may use methods and systems for receiving applications to receive other information, such as digital media, contacts, etc. For example, the device may apply similar techniques to search and present digital media to a user, which may enable the user to select the digital media. Based on the selection, the device may be configured to open that particular digital media in response to receiving input with keywords that correspond to the digital media without requiring additional input.

In yet another example, the device may enable a user to define further options associated with an application search. For example, the device may enable a user to define the location level associated with identified applications. In one such example, the device may allow a search to be configured to access applications that correspond to local restaurants rather than restaurants located far away and/or national-chain restaurants. Likewise, the device may further factor in specified hours that a user may find useful for applications. For example, the device may access applications that may be based on the hours selected by the user. Other examples of limiting the application search may exist as well.

In a further aspect, the device may be configured as a wearable computing device, such as glasses or a wristwatch, for example. The wearable computing device may include a variety of sensors or other user-interface components that may receive different types of inputs from a user or other computing device, for example. In addition, the device may receive inputs and communicate with a server that performs some and/or all the process for obtaining applications and providing the applications to a user to execute functions. The device may provide instructions for an application to execute a function, which may involve the application executing a function with assistance from a server.

In addition, the device may utilize multiple sources to obtain applications. For example, the device may scan the Internet and/or may analyze local connected data base libraries.

In another implementation, a device may receive multiple inputs from a user and perform multiple searches for applications. The device may compare the results of the multiple searches and based on the comparison, determine an application to install and execute. Likewise, the device may search for applications installed on the device and search for applications in a database simultaneously. For example, the device may receive an input requesting a cab and the device may perform a search on the device for a cab application and perform a search within databases for an application. The device may make a further determination whether to use an application stored on the device or to select and install an application from the database search.

Further, a device may be configured to operate multiple applications simultaneously. A device may configure one application to run in the background while another application may be executing a function. In particular, the device may be configured to receive multiple inputs and run similar methods to receive and install applications corresponding to the received inputs. In such an example, the device may perform method 300 or a similar process based on one received input and may perform method 300 or a similar process subsequently to another received input iteratively or simultaneously. In addition, the applications may execute functions for a device although the application may be located on a server (e.g., cloud).

Figure 5:
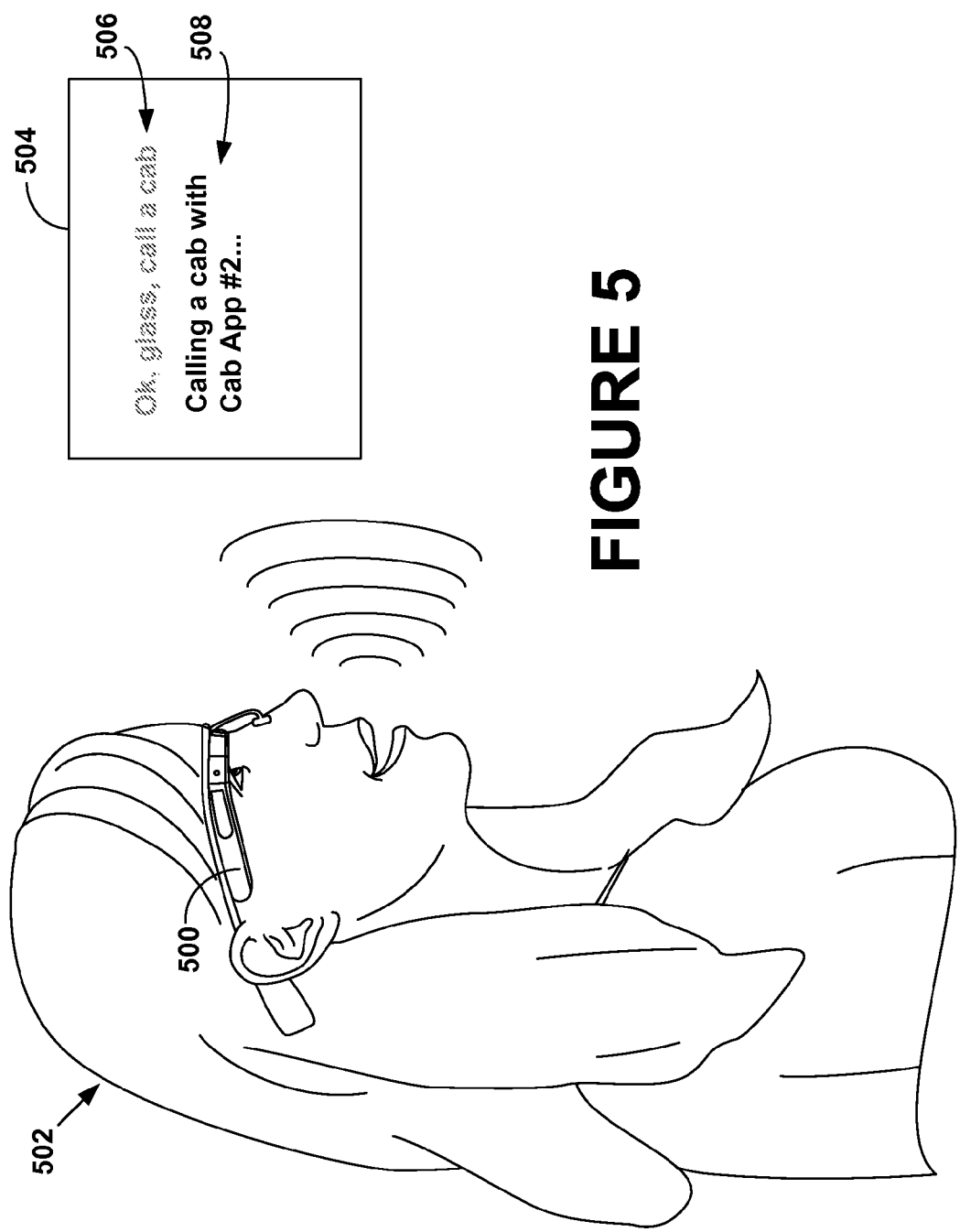
FIG. 5 shows a conceptual illustration of an example wearable computing device executing an installed application.

FIG. 5 illustrates a conceptual illustration of an example wearable computing device executing an installed application. The example wearable computing device 500 is in the form of wearable glasses, but may take other forms as well (e.g., a wearable watch). The wearable computing device 500 is positioned on the face of the user 502 using the user's nose and ears for support, but may be positioned on the user in other areas within other implementations.

FIG. 5 also shows an example view 504, which may exist as the view provided by the wearable computing device 502 to the user 504. Within the example view 504, a first line of text 506 shows the request or vocal command provided by the user 502 to the wearable computing device 500. In particular, the wearable computing device 500 received a request "Ok, glass, call a cab" from the user 502. In such an example, the wearable computing device 500 may be able to receive an input from the user 502 without requiring some form of physical input from the user 502 (e.g., only receiving an audio request). The user 502 is able to request a cab using the wearable computing device 500 in a hands-free technique.

In addition, the example view 504 provided as a visual display to the user 502 by the wearable computing device 500 may include a second line of text 508, which shows to the user 502 that the wearable computing device 500 may be executing the request of the user 502. In the example shown in FIG. 5, the second line of text 508 shows "Calling a cab with Cab App #2," which signals the user 502 that the wearable computing device 500 is executing a function in response to receiving the initial request from the user 502. In the particular conceptual illustration shown in FIG. 5, the wearable computing device 500 may already have the "Cab App #2" installed within memory or may have access the functions of the Cab App #2 (e.g., the application functions on a server for the device). In such a case, the wearable computing device 500 may execute the request received from the user 502 without searching, providing, and/or installing an application to complete the request.

Within other examples, the wearable computing device 500 may need to obtain an application or multiple applications to allow the user 502 to select an application to perform the requested task. In such an example, the wearable computing device 500 may execute a method, such as method 300, to query a database of applications and provide a prioritized list of applications to the user 502 to select an application for installation and use. The wearable computing device 500 may use various factors to determine which particular application to execute in response to receiving a command or request from the 502.

In addition, the wearable computing device 500 may be configured to execute functions in response to receiving an input from the user 502 without requiring additional inputs. For example, the wearable computing device 500 may receive a command and determine a proper application to execute the command. After determining the proper application, the wearable computing device 500 may retrieve the application or may simply open the application in the case that the application has already been installed on the wearable computing device 500. The wearable computing device 500 may proceed to execute the command or other request without requiring additional input from the user 502. Furthermore, the wearable computing device 500 may be configured to provide and/or receive feedback in various formats to assist in ensuring that the wearable computing device 500 is functioning properly (e.g., using the correct applications to execute tasks). The wearable computing device 500 may enable the user 502 to cancel a request at any point or may be configured to alter its functions based on receiving additional input, which may be received at any point while the wearable computing device 500 is functioning. Other examples of a wearable computing device executing functions may exist as well.

FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-3 and FIGS. 4A-4D. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the processor 112 of FIG. 1 may be configured to provide various operations, functions, or actions in response to the programming instructions 604 conveyed to the processor by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

The invention claimed is:

1. A method comprising:
   receiving, at a computing system, a verbal input;
   parsing the verbal input to recognize one or more keywords;
   identifying a plurality of applications associated with the recognized one or more keywords;
   determining a priority list for the plurality of applications based at least in part on a relevance associated with the one or more recognized keywords;
   providing for display, by the computing system, the priority list for the plurality of applications;
   receiving a request to access an application from the priority list for the plurality of applications; and
   in response to the request to access the application from the priority list for the plurality of applications, installing, by the computing system, the application, and executing the installed application after installing the application to perform a function based at least in part on the verbal input without receiving an additional input.

2. The method of claim 1, further comprising:
   receiving an additional verbal input;
   parsing the additional verbal input to recognize one or more additional keywords;
   determining that the recognized one or more additional keywords correspond to the installed application; and
   executing the installed application to perform another function based at least in part on the additional verbal input.

3. The method of claim 1, wherein determining a priority list for the plurality of applications based at least in part on the relevance associated with the recognized one or more keywords comprises:
   determining the priority list for the plurality of applications based also on user-reviews associated with respective applications of the plurality of applications.

4. The method of claim 1, wherein determining a priority for the plurality of applications based at least in part on the relevance associated with the recognized one or more keywords comprises:
   determining the priority for the plurality of applications based also on a purchase cost associated with installing respective applications of the plurality of applications.

5. The method of claim 1, wherein determining a priority for the plurality of applications based at least in part on the relevance associated with the recognized keyword comprises:
   determining the priority for the plurality of applications based also on promotion information corresponding to respective applications of the plurality of applications.

6. The method of claim 1, further comprising executing in an audio format at least part of the priority list for the plurality of applications.

7. A non-transitory computer-readable medium having stored thereon instructions, that when executed by a computing device having at least one processor, cause the computing device to perform functions comprising:
   receiving a verbal input;
   parsing the verbal input to recognize one or more keywords;
   identifying a plurality of applications associated with the recognized one or more keywords;
   determining a priority list for the plurality of applications based at least in part on a relevance associated with the one or more recognized keywords;
   providing for display the priority list for the plurality of applications;
   receiving a request to access an application from the priority list for the plurality of applications; and
   in response to the request to access the application from the priority list for the plurality of applications, installing the application, and executing the installed application after installing the application to perform a function based at least in part on the verbal input without receiving an additional input.

8. The non-transitory computer-readable medium of claim 7, wherein the parsed verbal input is a first verbal input, and wherein the instructions are further executable by the computing device to cause the computing device to perform functions comprising:
   receiving an additional verbal input;
   parsing the additional verbal input to recognize one or more additional keywords;
   determining that the recognized one or more additional keywords correspond to the installed application; and
   executing the installed application to perform a function based at least in part on the additional verbal input.

9. The non-transitory computer-readable medium of claim 7, wherein the function of parsing the verbal input to recognize one or more keywords comprises:
   determining a pitch or tone based on the verbal input; and
   parsing the verbal input to recognize one or more keywords based at least in part on the pitch or tone.

10. The non-transitory computer-readable medium of claim 7, wherein the function of determining a priority list for the plurality of applications based at least in part on the relevance associated with the recognized one or more keywords comprises:
   determining the priority list for the plurality of applications based also on a location of the device.

11. The non-transitory computer-readable medium of claim 7, wherein the function of identifying a plurality of applications associated with the recognized one or more keywords comprises identifying a plurality of applications based on a predefined threshold number of applications.

12. A system comprising:
   at least one processor; and
   a memory having stored thereon instructions that, upon execution by the at least one processor, cause the system to perform functions comprising:
      receiving an input;
      parsing the input to recognize one or more keywords;
      identifying a plurality of applications associated with the recognized one or more keywords;
      determining a priority list for the plurality of applications based at least in part on a relevance associated with the one or more recognized keywords;
      providing for display the priority list for the plurality of applications;
      receiving a request to access an application from the priority list of the plurality of applications; and
      in response to the request to access the application from the priority list for the plurality of applications, installing the application, and executing the installed application after installing the application to perform a function based at least in part on the input without receiving an additional input.

13. The system of claim 12, further comprising:
   receiving an additional input;
   parsing the additional input to recognize one or more additional keywords;
   determining that the recognized one or more additional keywords correspond to the installed application; and
   executing the installed application to perform a function based at least in part on the additional input.

14. The system of claim 12, wherein the function of determining a priority list for the plurality of applications based at least in part on the relevance associated with the recognized one or more keywords comprises:
   determining the priority list for the plurality of applications based also on a frequency of use associated with respective applications of the plurality of applications.

15. The system of claim 12, wherein the function of receiving an input comprises:
   receiving the input via text or detecting a motion input via a sensor.

16. The system of claim 12, wherein the function of identifying a plurality of applications associated with the recognized one or more keywords comprises:
   identifying a predefined number of applications associated with the recognized one or more keywords.

17. The system of claim 12, wherein executing the installed application to perform a function based at least in part on the input comprises:
   executing the installed application to perform a function using information stored in memory, wherein the information comprises one or more of contacts information, location information, and payment information.

18. The system of claim 17, wherein the input is a verbal input.

* * * * *